(12) United States Patent
Childress et al.

(10) Patent No.: US 10,262,116 B2
(45) Date of Patent: *Apr. 16, 2019

(54) FILE ORIGIN DETERMINATION

(71) Applicant: INTERNATIONAL BUSINESS MACHINES CORPORATION, Armonk, NY (US)

(72) Inventors: Rhonda L. Childress, Austin, TX (US); Michael J. Spisak, East Northport, NY (US); George E. Stark, Lakeway, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/799,173

(22) Filed: Oct. 31, 2017

(65) Prior Publication Data
US 2018/0068093 A1 Mar. 8, 2018

Related U.S. Application Data

(63) Continuation of application No. 14/809,848, filed on Jul. 27, 2015, now Pat. No. 9,910,967.

(51) Int. Cl.
*G06F 21/00* (2013.01)
*G06F 21/10* (2013.01)

(52) U.S. Cl.
CPC ............ *G06F 21/10* (2013.01); *G06F 21/105* (2013.01); *G06F 2221/0755* (2013.01)

(58) Field of Classification Search
CPC . G06F 21/10; G06F 21/105; G06F 2221/0755
See application file for complete search history.

(56) References Cited

U.S. PATENT DOCUMENTS

| 5,050,213 | A | * | 9/1991 | Shear | ................. G06F 12/1408 705/53 |
|---|---|---|---|---|---|
| 5,694,546 | A | | 12/1997 | Reisman | |
| 5,784,460 | A | * | 7/1998 | Blumenthal | ............ G06F 21/10 380/278 |
| 5,991,402 | A | | 11/1999 | Jia et al. | |
| 6,557,054 | B2 | | 4/2003 | Reisman | |
| 6,629,138 | B1 | | 9/2003 | Lambert et al. | |
| 7,069,554 | B1 | | 6/2006 | Stammers | |

(Continued)

OTHER PUBLICATIONS

CNET News.com Staff; Hackers can't interlope a Cryptolope; NET News; Apr. 22, 1996; 2 pages.

(Continued)

*Primary Examiner* — Don G Zhao
(74) *Attorney, Agent, or Firm* — Schmeiser, Olsen & Watts; Michael A. Petrocelli

(57) ABSTRACT

A file validation method and system is provided. The method includes retrieving from an authoritative source system, an artifact file. Identification information identifying a requesting user of the artifact file is recorded and associated metadata and a modified artifact file comprising the metadata combined with the artifact file are generated. An encryption key including a first portion and a second portion is generated and the first portion is stored within a central key store database. An encrypted package comprising the modified artifact file and the second portion of the key is generated.

18 Claims, 8 Drawing Sheets

(56) References Cited

U.S. PATENT DOCUMENTS

| | | | |
|---|---|---|---|
| 7,159,014 B2 | 1/2007 | Kausik | |
| 7,320,069 B1 * | 1/2008 | Sundharraj | G06F 21/10 348/E7.056 |
| 7,530,065 B1 | 5/2009 | Ciudad et al. | |
| 7,724,399 B2 | 5/2010 | Silverbrook | |
| 7,809,648 B2 | 10/2010 | Misra et al. | |
| 7,831,586 B2 | 11/2010 | Reitter | |
| 7,937,758 B2 | 5/2011 | Kronenberg et al. | |
| 8,015,299 B2 | 9/2011 | Omshehe et al. | |
| 8,321,352 B1 | 11/2012 | Rameshkumar et al. | |
| 8,473,894 B2 | 6/2013 | Fox et al. | |
| 8,521,779 B2 | 8/2013 | Hodgkinson et al. | |
| 8,595,186 B1 | 11/2013 | Mandyam | |
| 8,635,162 B2 | 1/2014 | Burkhart et al. | |
| 8,719,223 B2 | 5/2014 | Knapp | |
| 8,819,689 B2 | 8/2014 | Ohashi | |
| 8,874,487 B2 | 10/2014 | Ronning et al. | |
| 8,918,901 B2 | 12/2014 | Mandava et al. | |
| 8,924,424 B2 | 12/2014 | Hodgkinson et al. | |
| 9,100,245 B1 * | 8/2015 | Andrews | H04L 29/06836 |
| 9,141,769 B1 * | 9/2015 | Hitchcock | H04L 9/14 |
| 9,171,096 B2 | 10/2015 | Palanisamy et al. | |
| 9,313,458 B2 * | 4/2016 | Helms | H04L 63/0428 |
| 9,461,826 B2 | 10/2016 | Kreft | |
| 9,813,450 B1 | 11/2017 | Wasiq et al. | |
| 9,910,967 B2 | 3/2018 | Childress | |
| 2002/0007347 A1 * | 1/2002 | Blumenthal | G06F 21/105 705/51 |
| 2002/0104022 A1 | 8/2002 | Jorgenson | |
| 2003/0182563 A1 | 9/2003 | Liu et al. | |
| 2004/0039916 A1 * | 2/2004 | Aldis | G06F 21/10 713/177 |
| 2004/0098348 A1 | 5/2004 | Kawasaki et al. | |
| 2004/0167806 A1 | 8/2004 | Eichhorn | |
| 2005/0125285 A1 * | 6/2005 | McQueeney | G06F 21/10 705/14.4 |
| 2005/0289072 A1 | 12/2005 | Sabharwal | |
| 2006/0053080 A1 * | 3/2006 | Edmonson | G06F 21/10 705/59 |
| 2007/0233607 A1 | 10/2007 | Burkhart et al. | |
| 2007/0250448 A1 | 10/2007 | Burkhart et al. | |
| 2008/0175384 A1 * | 7/2008 | Byrne | G06F 21/10 380/255 |
| 2009/0259591 A1 | 10/2009 | Starostin et al. | |
| 2009/0271782 A1 | 10/2009 | Ciudad et al. | |
| 2010/0121775 A1 | 5/2010 | Keener, Jr. | |
| 2010/0161629 A1 | 6/2010 | Palanisamy et al. | |
| 2010/0269154 A1 | 10/2010 | Knowles | |
| 2010/0325431 A1 | 12/2010 | Mordetsky et al. | |
| 2011/0033050 A1 | 2/2011 | Maller | |
| 2011/0247075 A1 * | 10/2011 | Mykland | G06F 21/10 726/26 |
| 2011/0276622 A1 | 11/2011 | Knapp | |
| 2011/0320479 A1 | 12/2011 | Burris et al. | |
| 2012/0066493 A1 * | 3/2012 | Widergren | G06F 21/10 713/160 |
| 2013/0031643 A1 * | 1/2013 | Rogel | G06F 21/10 726/29 |
| 2013/0297922 A1 | 11/2013 | Friedman | |
| 2014/0189808 A1 | 7/2014 | Mahaffey et al. | |
| 2014/0355757 A1 | 12/2014 | Shrivastava et al. | |
| 2016/0125172 A1 * | 5/2016 | Fuller | G06F 21/105 726/26 |
| 2016/0306950 A1 * | 10/2016 | Schuman | G06F 21/10 |
| 2017/0032107 A1 | 2/2017 | Childress et al. | |
| 2017/0111172 A1 | 4/2017 | Sprenger | |
| 2017/0357780 A1 | 12/2017 | Childress | |
| 2017/0357781 A1 | 12/2017 | Childress | |

OTHER PUBLICATIONS

Friedman, Mark J.; List of IBM Patents or Patent Applications Treated As Related; Oct. 31, 2017; 1 page.

* cited by examiner

FILE ORIGIN DETERMINATION

This application is a continuation application claiming priority to Ser. No. 14/809,848 filed Jul. 27, 2015, now U.S. Pat. No. 9,910,967, issued Mar. 6, 2018, and is related to Ser. No. 15/667,743 filed Aug. 3, 2017 which is also a continuation application claiming priority to Ser. No. 14/809,848 filed Jul. 27, 2015, now U.S. Pat. No. 9,910,967, issued Mar. 6, 2018, and Ser. No. 15/667,803 filed Aug. 3, 2017 which is a divisional application claiming priority to Ser. No. 14/809,848 filed Jul. 27, 2015, now U.S. Pat. No. 9,910,967 issued Mar. 6, 2018.

FIELD

The present invention relates generally to a method for determining an origin of a file, and in particular to a method and associated automated system for fetching an artifact file and generating an encrypted artifact file that includes key attributes for determining a file origin in accordance with a licensing agreement.

BACKGROUND

Managing various systems requires software tools from multiple vendors to be installed by: downloading from the tools a vendor location, executing the tools from a storage disk, and/or retrieving the tools from a third party site. An associated end user license agreement for the tools may include language requiring a user to determine a location associated with receiving the file. In order to maintain legal compliance with end user license agreements, a user of an originating organization downloading the software, must fingerprint the file with key information to demonstrate that the tool has been captured and installed within the terms of the license.

SUMMARY

A first aspect of the invention provides a file validation method comprising: retrieving, by a computer processor of a computing system from an authoritative source system, an artifact file; recording, by the computer processor, identification information identifying a requesting user of the artifact file; generating, by the computer processor, metadata describing the information; generating, by the computer processor, a modified artifact file comprising the metadata combined with the artifact file; generating, by the computer processor, an encryption key comprising a first portion and a second portion; storing, by the computer processor, the first portion of the key within a central key store database; and generating, by the computer processor, an encrypted package comprising the modified artifact file and the second portion of the key.

A second aspect of the invention provides a file validation method comprising:

requesting, by a computer processor of a computing system executing an agent in response to a request from a requesting user, a detachable fetch software module; retrieving, by the computer processor from a service provider computer, the detachable fetch software module; downloading, by the computer processor executing the detachable fetch software module, an artifact file; generating, by the computer processor executing the detachable fetch software module, a digital fingerprint associated with securing the artifact file; and executing, by the computer processor, the digital fingerprint with respect to the artifact file.

A third aspect of the invention provides a computer program product for file validation, the computer program product comprising: one or more computer-readable, tangible storage devices; program instructions, stored on at least one of the one or more storage devices, to retrieve from an authoritative source system, an artifact file; program instructions, stored on at least one of the one or more storage devices, to record identification information identifying a requesting user of the artifact file; program instructions, stored on at least one of the one or more storage devices, to generate metadata describing the information; program instructions, stored on at least one of the one or more storage devices, to generate a modified artifact file comprising the metadata combined with the artifact file; program instructions, stored on at least one of the one or more storage devices, to generate an encryption key comprising a first portion and a second portion; program instructions, stored on at least one of the one or more storage devices, to store the first portion of the key within a central key store database; and program instructions, stored on at least one of the one or more storage devices, to generate an encrypted package comprising the modified artifact file and the second portion of the key.

The present invention advantageously provides a simple method and associated system capable of managing various systems.

DETAILED DESCRIPTION

Figure 1:
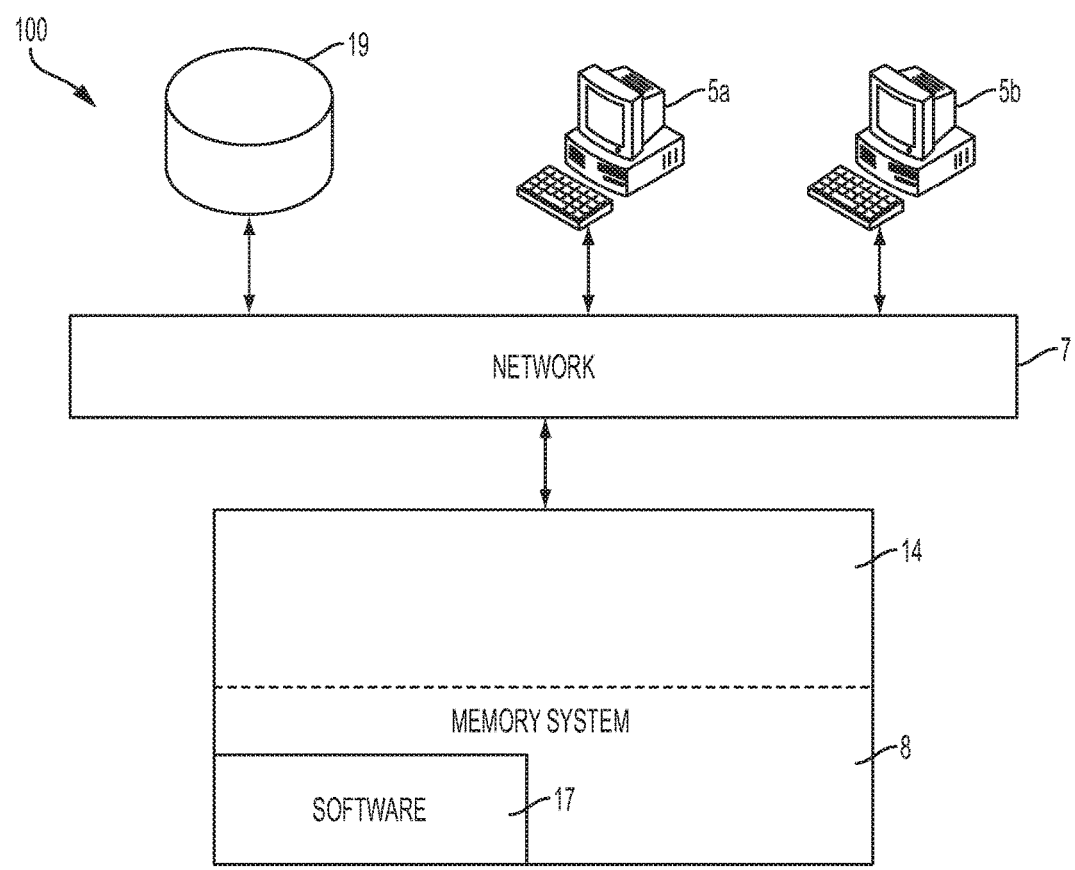
FIG. 1 illustrates a system for generating an encrypted artifact file that includes key attributes for determining a file origin in accordance with a licensing agreement, in accordance with embodiments of the present invention.

FIG. 1 illustrates a system 100 for generating an encrypted artifact file that includes key attributes for determining a file origin with respect to a licensing agreement, in accordance with embodiments of the present invention. System 100 enables a method for generating and encrypting metadata (including attributes) describing a licensing agreement associated with a received executable file. The encrypted metadata is combined (or wrapped) with the executable file for distribution. The attributes may comprise:

1. Information for identifying a name of a user initiating reception of the executable file.
2. An IP address of a computing system (e.g., computing system 5a or 5b) generating and encrypting the metadata.
3. An identifier for a network (e.g., network 7) receiving the executable file.

The computing system may transmit the encrypted metadata and an associated log to a centralized server (e.g., computing system 14). The log may indicate that the encrypted metadata was generated successfully. The centralized server may validate that the wrapped executable file has been executed by a computing system and remains in compliance with a licensing agreement. The centralized server may additionally decrypt the encrypted metadata.

The above and other features of the present invention will become more distinct by a detailed description of embodiments shown in combination with attached drawings. Identical reference numbers represent the same or similar parts in the attached drawings of the invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

System 100 of FIG. 1 includes computing systems 5a and 5b and a data store 19 connected through a network 7 to a computing system 14 (e.g., a centralized server). Network 7 may include any type of network including, inter alia, a local area network, (LAN), a wide area network (WAN), the Internet, a wireless network, etc. Computing systems 5a and 5b may include any type of computing device or system including, inter alia, a computer (PC), a laptop computer, a tablet computer, a server, a PDA, a smart phone, etc. Computing system 14 may include any type of computing system(s) including, inter alia, a computer (PC), a laptop computer, a tablet computer, a centralized server, etc. Computing system 14 includes a memory system 8. Memory system 8 may include a single memory system. Alternatively, memory system 8 may include a plurality of memory systems. Memory system 8 includes software 17.

System 100 enables a process for fingerprinting an artifact file and determining that the artifact file conforms to an end user license agreement. In order to initiate the process, a specified artifact file (e.g., a software tool, a software application, a binary, a file, etc.) is retrieved via a download or a copy function. In response, a stamp is generated around (i.e., wrapped) the file. The artifact file is encrypted with key attributes required for activation by the end user license agreement. The encrypted artifact file and key attributes are logged into data store 19. The key attributes may include, inter alia, a customer account ID, an IP address, a date and/or time, a location, etc. The encrypted artifact file is wrapped with the encrypted meta-data resulting in the generation of a portable binary for execution. After the portable binary has been executed, the stamp is validated. In response, computing system 14 transmits results of the executing the portable binary to data store 19. Additionally, system 100 validates the presence of the artifact file and matches the key attributes to the stamp in order to validate that the fetched components are retrieved. System 100 further generates a decrypted output associated with auditing processes.

Therefore, system 100 enables a process that includes:
1. Receiving an executable file.
2. Generating metadata (comprising licensing agreement metadata) associated with the executable file.
3. Encrypting the metadata.
4. Wrapping the encrypted metadata with the executable file.
5. The encrypted metadata and associated log are transmitted to a centralized server.
6. The centralized server validates (in response to the wrapped executable file being executed) that the execution is associated with the licensing agreement.
7. The encrypted metadata is decrypted and outputted for user validation.

Figure 2:
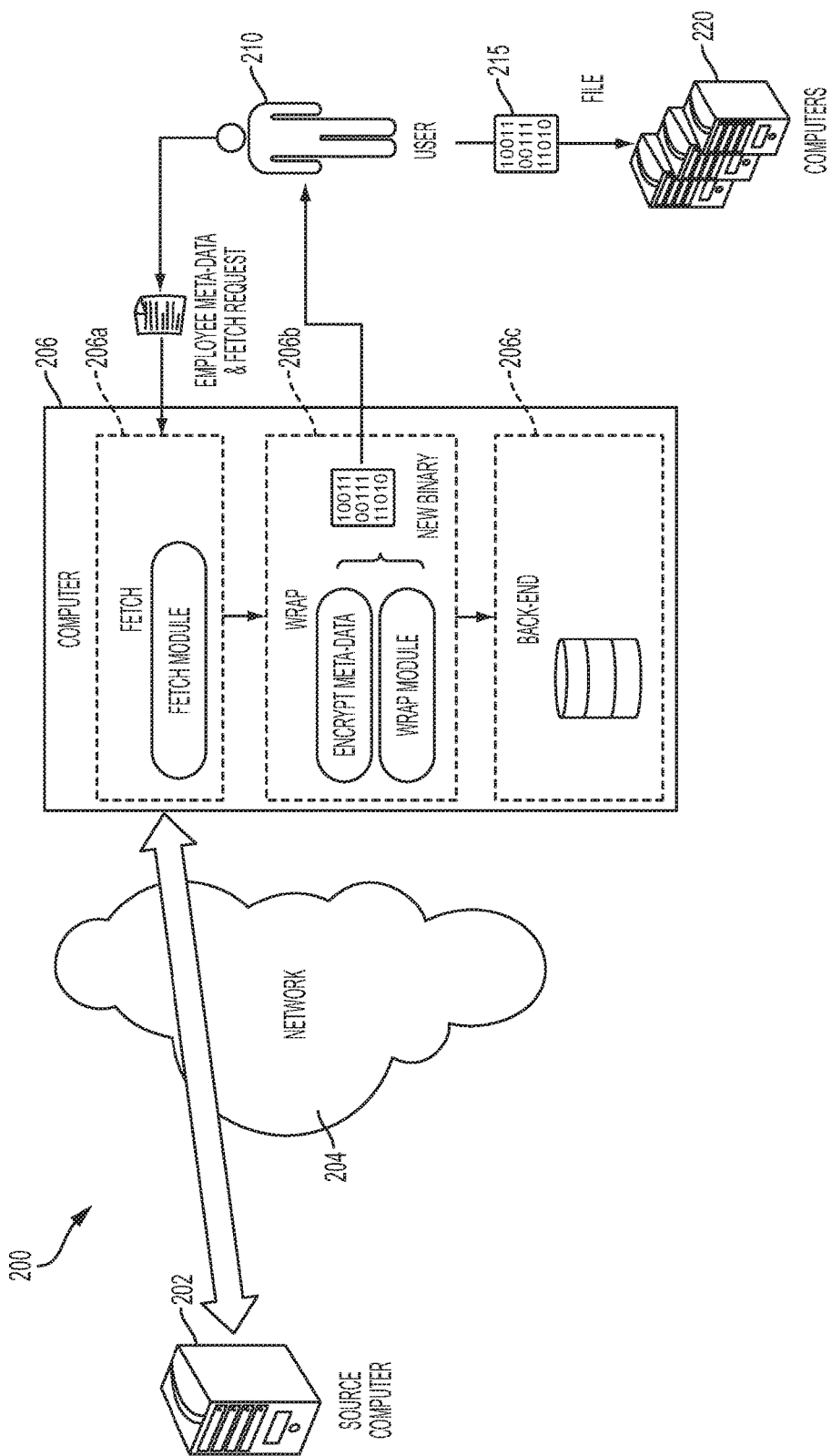
FIG. 2 illustrates a system describing an implementation example for implementing a process for downloading a software tool, in accordance with embodiments of the present invention.

FIG. 2 illustrates a system 200 describing an implementation example for implementing a process for downloading a software tool, in accordance with embodiments of the present invention. The process includes a user 210 requesting a software tool download from a software tool vendor. System 200 comprises a fetch component 206a, a wrap component 206b, and a back-end component 206c enabling a process for fingerprinting an origin of a file artifact and maintaining associated records for, inter alia, determining appropriate end user license conformance. Although system 200 in FIG. 2 illustrates fetch component 206a, wrap component 206b, and back-end (data store) component 206c residing on a single computer 206, note that the aforementioned components may be distributed across multiple computers in multiple locations.

Fetch component 206a fetches a desired artifact file (e.g., a tool, software, a binary, a file, etc.) via a downloading process or a copy process with respect to a source computer 202 via a designated network 204. Fetch component 206a is initiated by a user 210 requesting a file artifact from source computer 202. Additionally, fetch component 206a retrieves additional user 210 identifying information. The additional user 210 identifying information in combination with the retrieved artifact file from source computer 202 is passed to wrap component 206b. In response, wrap component 206b generates a wrapper (of data) around the file artifact including encrypted key attributes (e.g. customer account ID, to/from IP address, a network used (e.g., network 204), a date/time, a location for computer 206, additional meta-data, etc.). The key attributes are encrypted to prevent tampering. The key attributes may include information required by an end user license agreement (EULA) of the file artifact thereby determining end user license compliance.

For example, a sample EULA may specify that free utilities (of a software application) may not be used with respect to the following circumstances:
1. Working around technical limitations within binary versions of the software application.
2. Reverse engineering, decompiling, and/or disassembling the binary versions of the software application.
3. Generating additional copies of the software application with respect to limitations specified in the EULA.
4. Publishing the software application for additional users to copy.
5. Renting, leasing, and/or or lend the software application to others.
6. Transferring the software application to any third party.
7. Using the software application for commercial software hosting services.

The key attributes are enabled to determine where a file (i.e., the software application) was fetched from (i.e., a host name ip address, a name of the file, a size of file(s), a date time stam, etc). For example, a backend mechanism (e.g., back-end component 206c) may retrieve an artifact and generate decrypted meta-data as an output (e.g., the file was downloaded on May 7, 2014 by Mike S from company A.com [IP: 204.123.123.13] to hostname ABC123 [IP: 9.123.123.123] via subnet 9.0.0.1, via gateway 9.1.1.2, <other data, as needed>). In response, a fetch module requires a configuration file for translating necessary information with respect to what information is needed to satisfy necessary information for fingerprinting. The configuration file specifies how many items are necessary for collection and how to collect the items. The associated information is listed in a specified order for output. For example, a configuration/output file may comprise the aforementioned information:

This file was downloaded on May 2014 by Mike S from company A.com [IP: 204.123.123.13] to hostname ABC-123.company A.com [IP: 9.123.123.123] via subnet 9.0.0.1, via gateway 9.1.1.2, <other data, as needed>.

A format for the configuration/output file comprises a defined delimiter (e.g., an = sign) and a command to run (e.g., double quotes (") or backslash (\)) for specifying how to collect information. An optional delimiter may specify where to run the command (e.g., an ntp server).

A dateline associated with the configuration/output file specifies:
1. A number of parms (parameters)
2. A date=ntp server
3. A name="who" (returning a name of a user enabling the fetch module).
4. A hostname=parm2 (e.g., fetchpatch parm1, parm2, parm3, etc.).
5. A hostname ip="gethostbyip"

The configuration/output is generated during file retrieval and is pre-coded and hidden to prevent spoofing.

Wrap component 206b transmits the collected data (i.e., associated with the file artifact) to back-end (data store) component 206c for historical and auditing processes. Additionally, wrap component 206b generates a portable binary file 215 for execution. Portable binary file 215 is transmitted to user 210. Portable binary file 215 may be executed on target computers 220. Upon execution, target computers 220 notifies back-end (data store) component 206c that portable binary file 215 has been executed. Upon execution, target computers 220 validate an internal stamp and transmit related information to a data store indicating execution.

System 200 enables the following processes:
1. Validating a file artifact with respect to target computers 220 and generating an alert if the validation fails. Validation may be determined based on any number of policies and conditions from meta-data of the file artifact and/or target environments.
2. Determining (with respect to an audit) that all file artifacts were fetched with respect to a specified user 210, a specified network 204, a specified source computer 202, residence on any number of target computer environments.
3. Retrieving binary file 215 from target computers 220 and transmitting binary file 215 to back-end component 206c to generate a file artifact output such as, inter alia, a user initiating a process for retrieving the file artifact, an associated computer for retrieval, an associated network for retrieval, and file artifact origination source.

Figure 3:
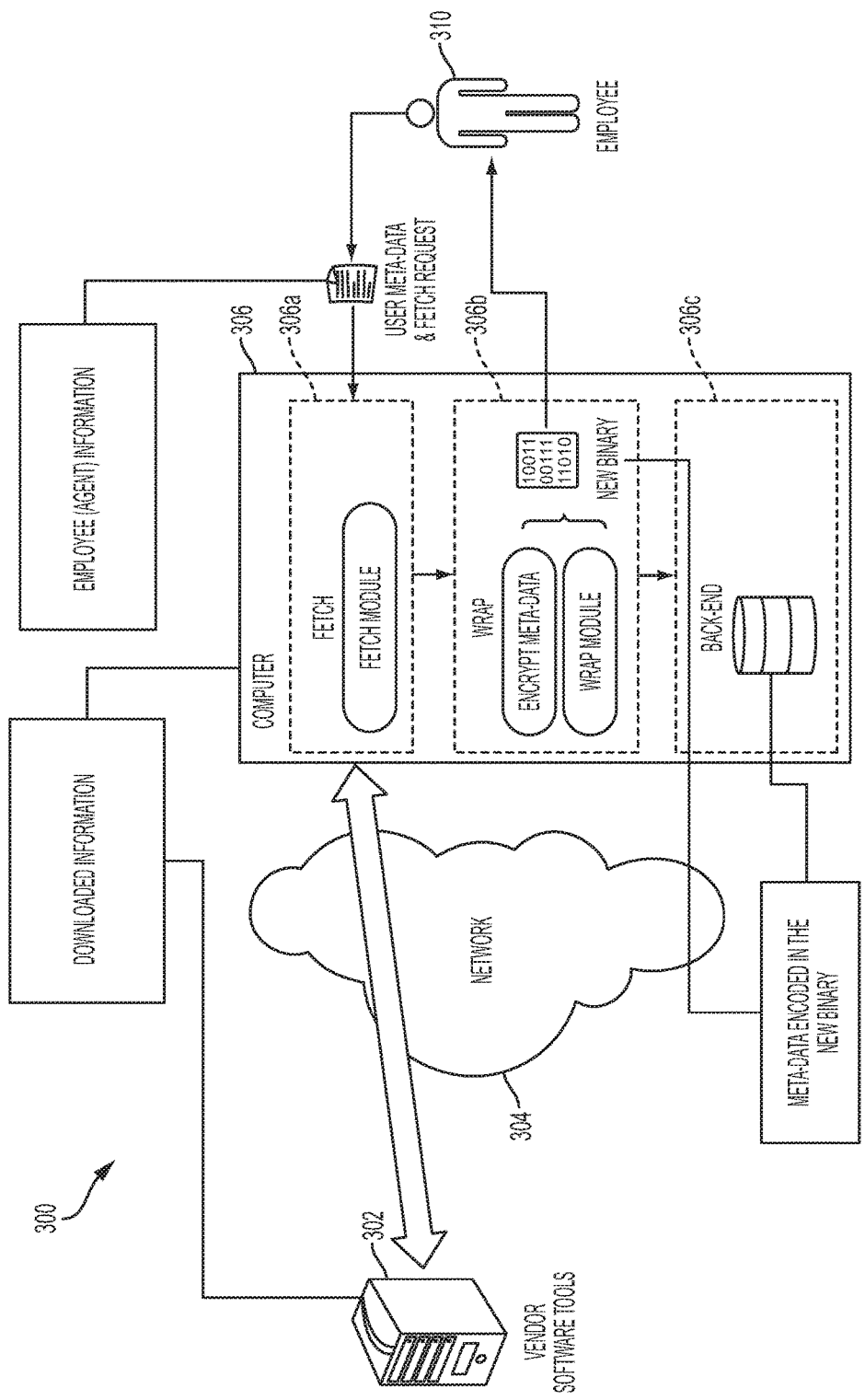
FIG. 3 illustrates a system describing an implementation example for implementing a process for collecting metadata associated with the downloaded software tool of FIG. 2, in accordance with embodiments of the present invention.

FIG. 3 illustrates a system 300 describing an implementation example for implementing a process for collecting metadata associated with tracking the downloaded software tool of FIG. 2, in accordance with embodiments of the present invention. The process includes an employee 310 interfacing with computer 306 and requesting a file artifact to be fetched via fetch component 306a. While fetch component 306a retrieves a file artifact for employee 310, information with respect to the transaction, retrieval, and file artifact is generated. The information may include, inter alia, a customer account ID associated with retrieval of the file artifact, an associated IP address and network used, a date/time, a location, etc. A wrap component 306b transmits the information to a back-end (data store) computer 306c for historical and auditing purposes. Additionally, wrap component 306b generates a portable binary file execution delivered back to employee 310.

Figure 4:
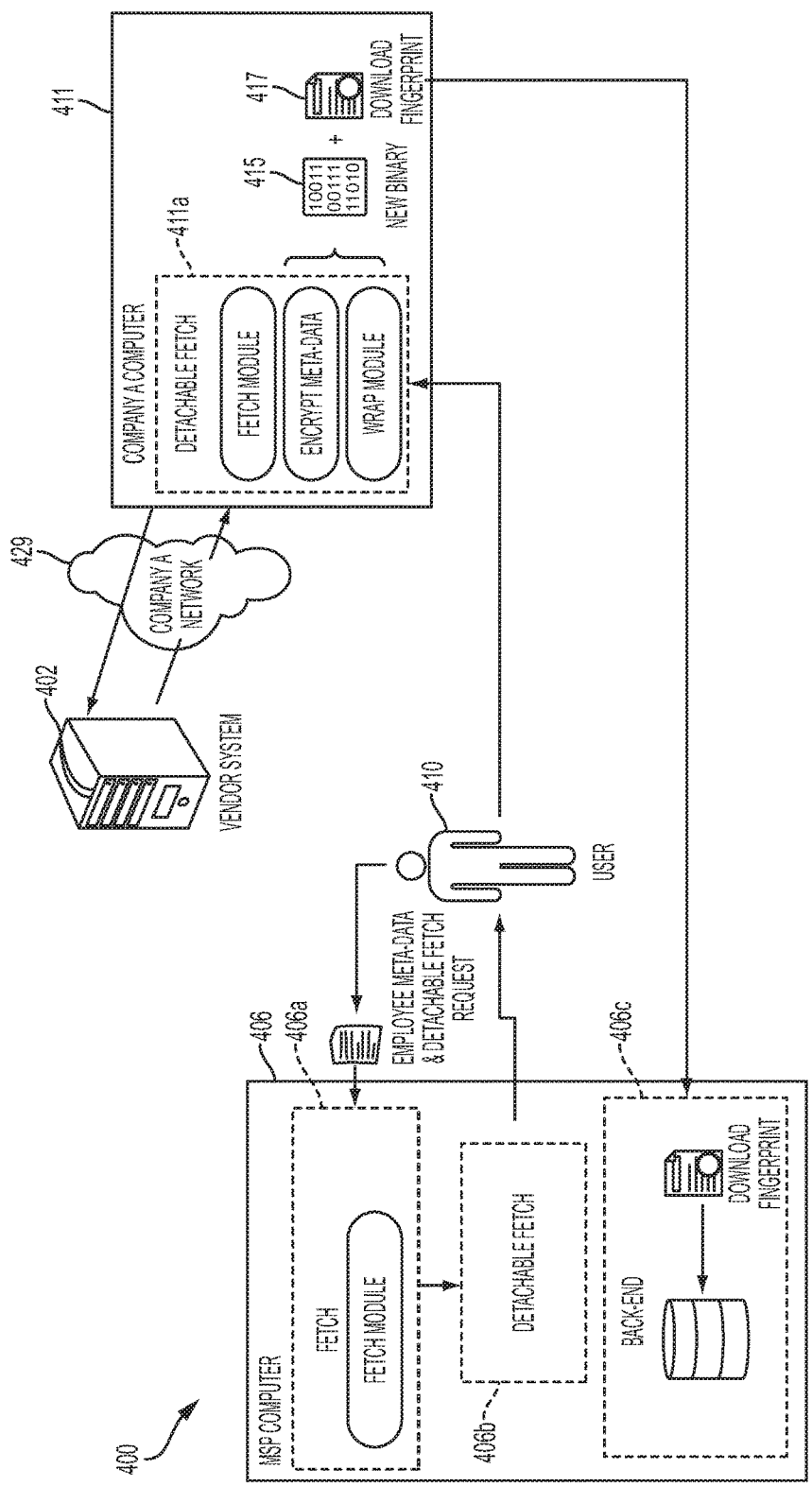
FIG. 4 illustrates a system describing an implementation example for implementing a process for generating a detachable fetch module, in accordance with embodiments of the present invention.

FIG. 4 illustrates a system 400 describing an implementation example for implementing a process for generating a detachable fetch module 411a, in accordance with embodiments of the present invention. System 400 allows a fetch component 406a originally residing on a managed service provider (MSP) computer 406 to be detached (in response to a user request) and become a standalone fetch component 406b. A MSP computer is defined herein as a point managed service computer host on a cloud. Fetch component 406a is detached so that the retrieval of a file artifact from a vendor system 402 may be performed using a remote computer 411 (i.e., from MSP computer 406) and associated network 429, respectively. Standalone fetch component 406b is delivered back to the requesting user 410 as a portable executable fetch component. User 410 enables detachable fetch module 411a and executed the detachable fetch module 411a from a different computer 411.

Detachable fetch module 411a retrieves a file artifact on behalf of user 410 and generates/extracts information associated with the transaction, the retrieval, and the file artifact (e.g., a customer account ID used to retrieve the file artifact, an IP address and network used for the retrieval, a date/time, a location, etc.

Detachable fetch module 411a provides the capability to perform a wrapping process resulting in the generation of a newly generated portable binary file 415 for execution. Portable binary file 415 is delivered back user 410. Portable binary file 415 is deployed and executed within additional target computer environments within a Company A. Execution of portable binary file 415 generates an additional fingerprint certificate 417 and the additional fingerprint certificate 417 is provided back to user 410. Fingerprint certificate 417 comprises data associated with the file artifact collected in an encrypted format generated during the fetch. Fingerprint certificate 417 is provided to back-end component 406c for insertion into the data store for long term archiving.

System 400 includes a computing system 406 associated with a company A computing system 411 initiating a process for downloading a software tool from a vendor system 402. MSP computing system 406 tracks all software tools being downloaded by all customers accessing system 400. The software tool is downloaded via company A network 429 in accordance with a licensing agreement associated with the software tool. The process is initiated when a user 410 requests a detachable fetch module for retrieving the software tool. In response, a fetch module 406a is retrieved by computing system 406. A detachable fetch module 411a associated with the fetch module 406a is transmitted to company A computing system 411. For example, a user may interact with system 400 and use a GUI to request a detachable fetch module. The detachable fetch module comprises a form of a file that the user transfers to a target system on a customer's network (e.g., via a network, a file/copy, a USB stick, etc.). The detachable fetch module (i.e., on the target system in the customer's network) is enabled to download a file from the internet. The detachable fetch module 411a enables a process for downloading the software tool to company A computing system 411. In response, the detachable fetch module 411a generates a binary and associated fingerprint related to the software tool and the fingerprint is transmitted to MSP computing system 406.

The detachable fetch module 411*a* comprises detachable functionality such that it may be enabled to retrieve an artifact (e.g., the software tool) from a remote location. The artifact is retrieved from a remote location because (in a managed services provider (MSP) environment) the system 400 may not be installed on a customer's network. Therefore, a detachable method enables the system 400 to reside on a MSP network to download (fetch) a file from the customer's network. System 400 enables a detached mode for retrieving the detachable fetch module 411*a* by retrieving the detachable fetch module 411*a* and transmitting a request for a detached fetch component 406*b*. In response, system 400 receives input data from the user 410 authorizing the user 410 to enable the (single use) detachable fetch module 411*a* movable to a remote location and enabled to fetch an artifact such as the software tool. The detachable fetch module 411*a* comprises data associated with the user 410. The data enables a fingerprinting process associated with the artifact. Upon conclusion of the fingerprinting process, a fingerprint output file is generated and transmitted to computing system 406 for use by a central data store.

Figure 5:
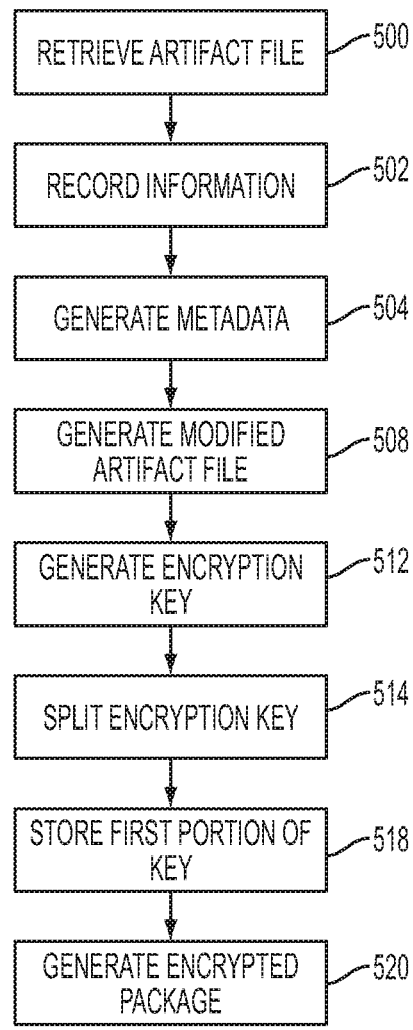
FIG. 5 illustrates an algorithm detailing a process flow enabled by the system of FIG. 1 for generating an encrypted package, in accordance with embodiments of the present invention.

FIG. 5 illustrates an algorithm detailing a process flow enabled by system 100 of FIG. 1 for generating an encrypted package, in accordance with embodiments of the present invention. Each of the steps in the algorithm of FIG. 5 may be enabled and executed in any order by a computer processor executing computer code. In step 500, program code retrieves (from an authoritative source system) an artifact file such as, inter alia, a software tool. In step 502, program code records information associated with a requesting user of the artifact file. The information may include, inter alia, a Website URL, a requester ID, a subnet associated with retrieving the artifact file, etc. The recoding process may include recording data associated with the requesting user, the artifact file, and the computing system. In step 504, program code generates metadata comprising the information recorded in step 502. The metadata may include licensing information associated with the artifact file. In step 508, program code generates a modified artifact file comprising the metadata combined with the artifact file. In step 512, program code generates an encryption key. In step 514, program code splits the encryption key into a first portion and a second portion. In step 518, program code stores the first portion of the key within a central key store database. In step 520, program code generates an encrypted package that includes the modified artifact file and the second portion of the key via split key encryption. Alternatively, a public/private key may be enabled such that the first portion and second portion of the key are used in a mathematical operation to retrieve a primary key.

Figure 6:
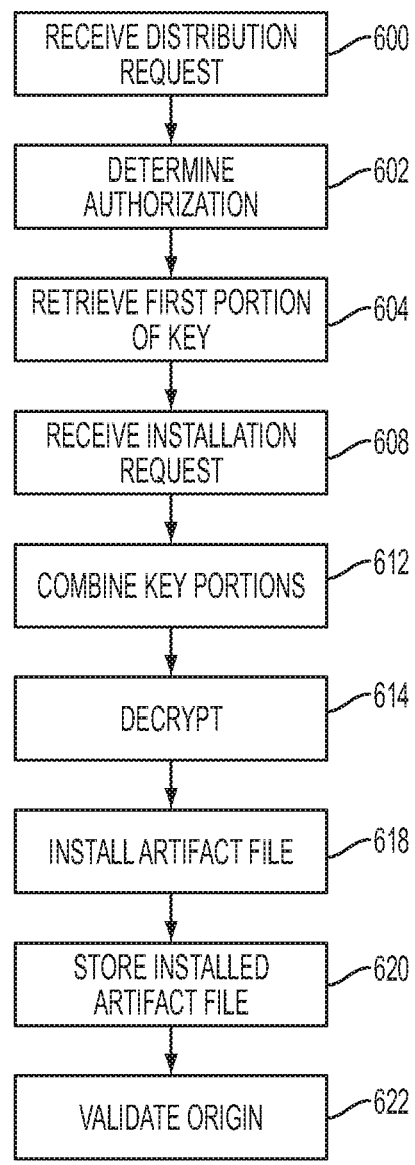
FIG. 6 illustrates an algorithm detailing a process flow enabled by the system of FIG. 1 for distributing the encrypted package generated in FIG. 5, in accordance with embodiments of the present invention.

FIG. 6 illustrates an algorithm detailing a process flow enabled by system 100 of FIG. 1 for distributing the encrypted package generated in FIG. 5, in accordance with embodiments of the present invention. Each of the steps in the algorithm of FIG. 6 may be enabled and executed in any order by a computer processor executing computer code. In step 600, program code receives a request for distribution of an encrypted package (i.e., the encrypted package of step 520 of the algorithm of FIG. 5) from a user. In step 602, program code determines that the user is authorized to access the encrypted package via fingerprint store information. The fingerprint store information may be stored as a table reserved for packages generated for specified clients. A data store, key store, and interface may be stored on a single client network such that a client needs to be able to prove where files came from. Alternatively, data store, key store, and interface may be split between a client and an MSP. In step 604, program code retrieves (in response to results of the authorization of step 602) the first portion of the key (of step 518 of FIG. 5) from the central key store database. In step 608, program code receives a user request for installing the artifact file (of step 500 of FIG. 5). In step 612, program code combines the first portion of the key with the second portion (of step 514 of FIG. 5) of the key comprised by the package. In step 614, program code decrypts (in response to results of step 612) the encrypted package resulting in a decrypted package comprising the modified artifact file. In step 618, program code stores the artifact file in a computing system. In step 620, program code stores (as a hidden file) the metadata (of step 504 of FIG. 5) with the installed artifact file. In step 622, program code validates (based on the metadata) an origin of the artifact file by running the artifact file through the central key store database.

Figure 7:
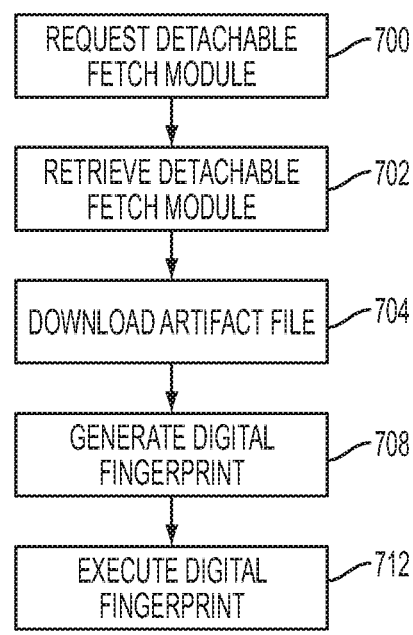
FIG. 7 illustrates an algorithm detailing a process flow enabled by the system of FIG. 1 for generating an encrypted package via a detachable fetch module, in accordance with embodiments of the present invention.

FIG. 7 illustrates an alternative algorithm from the algorithm of FIG. 5 detailing a process flow enabled by system 400 of FIG. 4 for generating an encrypted package via a detachable fetch module, in accordance with embodiments of the present invention. Each of the steps in the algorithm of FIG. 7 may be enabled and executed in any order by a computer processor executing computer code. In contrast to the algorithm of FIG. 5, the algorithm of FIG. 7 enables a detachable fetch module with respect to a services provider model. For example, system 400 resides on a service provider network and files are to be retrieved files with respect to customers from an external customer network. Therefore, the detachable fetch module enables a detached fetch mode for retrieving the file from the customer network.

In step 700, program code requests (via execution of an agent in response to a request from a requesting user) a detachable fetch software module. In step 702, program code retrieves (from a service provider computer) the fetch software module. In step 704, program code downloads (via execution of the detachable fetch software module) an artifact file. In step 708, program code generates a digital fingerprint associated with securing the artifact file (i.e., an encrypted package is generated) as described with respect to steps 504-520 of FIG. 5, supra. In step 712, program code executes the digital fingerprint with respect to the artifact file.

Figure 8:
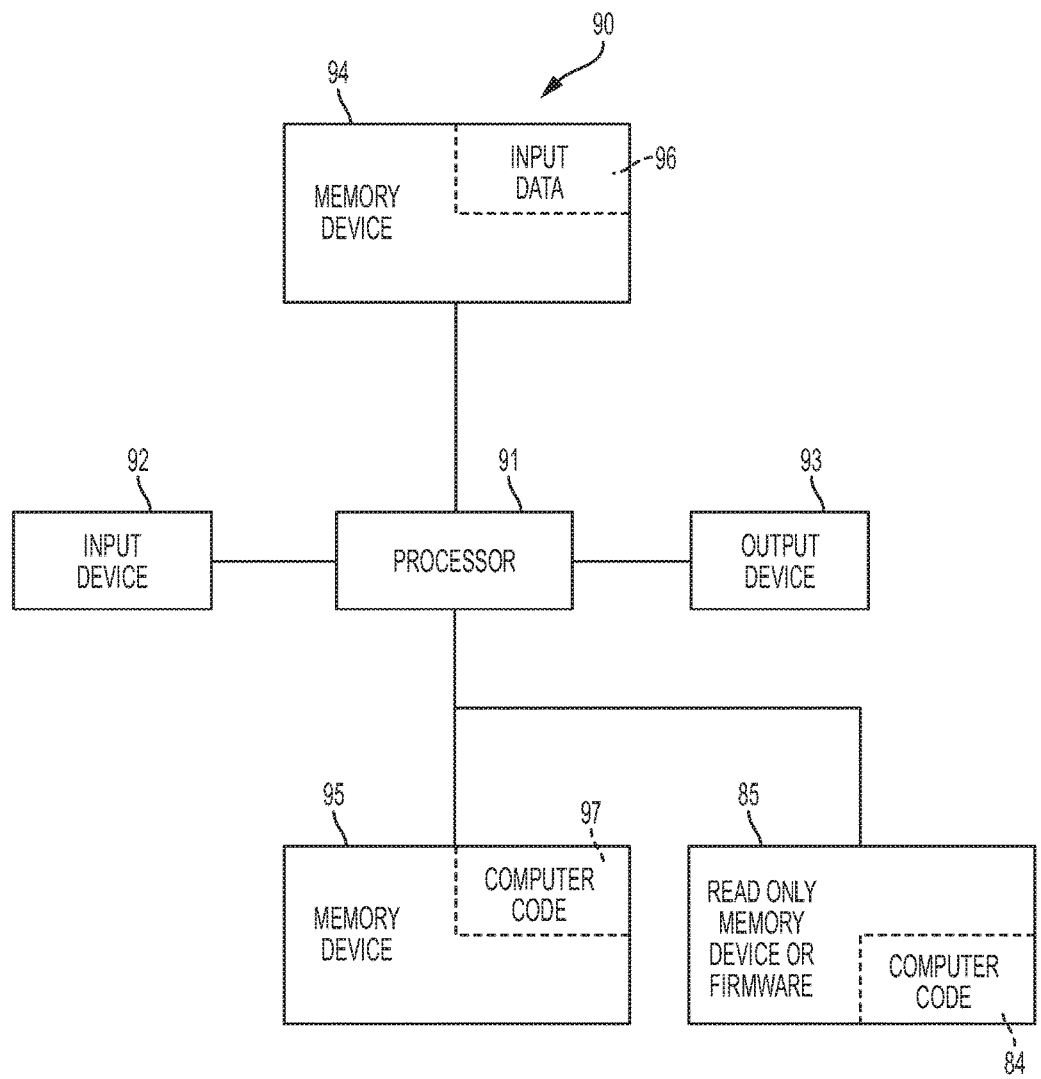
FIG. 8 illustrates a computer apparatus for generating an encrypted artifact file that includes key attributes for determining a file origin in accordance with a licensing agreement, in accordance with embodiments of the present invention.

FIG. 8 illustrates a computer apparatus 90 for generating an encrypted artifact file that includes key attributes for determining a file origin in accordance with a licensing agreement, in accordance with embodiments of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 5-7) for generating an encrypted artifact file that includes key attributes for determining a file origin in accordance with a licensing agreement. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 8) may include the algorithms of FIGS. 5-7 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithms of FIGS. 5-7) may be stored on a static, nonremovable, read-only storage medium such as a Read-Only Memory (ROM) device 85, or may be accessed by processor 103 directly from such a static, nonremovable, read-only medium 85. Similarly, in some embodiments, stored computer program code 84 may be stored as computer-readable firmware 85, or may be accessed by processor 103 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to for generate an encrypted artifact file that includes key attributes for determining a file origin in accordance with a licensing agreement. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for generating an encrypted artifact file that includes key attributes for determining a file origin in accordance with a licensing agreement. In another embodiment, the invention provides a method that performs the process steps of the invention on a subscription, advertising, and/or fee basis. That is, a service supplier, such as a Solution Integrator, could offer to generate an encrypted artifact file that includes key attributes for determining a file origin in accordance with a licensing agreement. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:
1. A file validation method comprising:
generating, by a computer processor of a computing system, metadata describing identification information identifying a requesting user of an artifact file retrieved via a fetch component external to said computing system from an authoritative source system, wherein said metadata comprises attributes including an IP address for said computing system and an identifier for a network receiving said artifact file;
generating, by said computer processor, a log indicating that encrypted metadata has been successfully generated from said metadata;
generating, by said computer processor, a modified artifact file comprising said encrypted metadata combined with said artifact file and said log;
validating, by said processor, that said modified artifact file is in compliance with a licensing agreement for execution of said artifact file resulting in a generation of a portable binary for execution;
generating, by said computer processor, an encryption key comprising a first portion and a second portion;
storing, by said computer processor, said first portion of said key within a central key store database; and
generating, by said computer processor, an encrypted package comprising said modified artifact file and said second portion of said key.
2. The method of claim 1, further comprising:
receiving, by said computer processor from said user, a request for distribution of said encrypted package;
determining, by said computer processor, that said user is authorized to access said encrypted package; and
retrieving, by said computer processor in response to results of said determining, said first portion of said key from said central key store database.
3. The method of claim 2, further comprising:
receiving, by said computer processor from said user, a request for installing said artifact file;
combining, by said computer processor, said first portion of said key with said second portion of said key comprised by said package;
decrypting, by said computer processor in response to results of said combining, said encrypted package resulting in a decrypted package comprising said modified artifact file;
installing, by said computer processor in an external computing system, said artifact file; and
storing, by said computer processor as a hidden file, said metadata with said installed artifact file.
4. The method of claim 3, further comprising:
validating, by said computer processor based on said metadata, an origin of said artifact file, wherein said validating comprises running said encryption key through said central key store database to retrieve said origin via said metadata.
5. The method of claim 1, wherein said information comprises data selected from the group consisting of a URL associated with a browser said computing system, an identification for said user, and a subnet used to perform said retrieving.
6. The method of claim 1, wherein said recording comprises:
recording an ID for said requesting user;
recording a Website URL associated with retrieving said artifact file; and
recording a subnet ID for said computing system.
7. The method of claim 1, wherein said identification information comprises a name of said requesting user, an email address of said requesting user, and employee related information associated with said requesting user.

8. The method of claim 1, wherein data associated with said artifact file comprises an IP address of said authoritative source system, a date and time of requesting said artifact file, and a file size of said artifact file.

9. The method of claim 1, wherein data associated with said computing system comprises an IP address of a destination system for said artifact file and a subnet associated with said artifact file.

10. The method of claim 1, wherein said metadata defines terms describing said license agreement of said artifact file.

11. The method of claim 1, further comprising:
providing at least one support service for at least one of creating, integrating, hosting, maintaining, and deploying computer-readable code in the computing system, said code being executed by the computer processor to implement said generating, said metadata, said generating said modified artifact file, said generating said encryption key, said storing, and said generating said encrypted package.

12. A computer program product for file validation executed by at least one processor of a computing system, the computer program product comprising:
one or more computer-readable, hardware storage devices and program instructions, stored on at least one of the one or more storage devices, to:
retrieve, via a fetch component external to said computing system, from an authoritative source system, an artifact file;
generate metadata describing identification information identifying a requesting user of said artifact file retrieved via a fetch component external to said computing system from an authoritative source system, wherein said metadata comprises attributes including an IP address for said computing system and an identifier for a network receiving said artifact file;
generate a log indicating that encrypted metadata has been successfully generated from said metadata;
generate a modified artifact file comprising said encrypted metadata combined with said artifact file and said log;
validate that said modified artifact file is in compliance with a licensing agreement for execution of said artifact file resulting in a generation of a portable binary for execution;
generate an encryption key comprising a first portion and a second portion;
store said first portion of said key within a central key store database; and
generate an encrypted package comprising said modified artifact file and said second portion of said key.

13. The computer program product of claim 12, wherein said program instructions are further configured to:
receive from said user, a request for distribution of said encrypted package;
determine that said user is authorized to access said encrypted package; and
retrieve in response to results of determining that said user is authorized to access said encrypted package, said first portion of said key from said central key store database.

14. The computer program product of claim 13, wherein said program instructions are further configured to:
receive from said user, a request for installing said artifact file;
combine said first portion of said key with said second portion of said key comprised by said package;
decrypt in response to results of combining said first portion of said key with said second portion of said key, said encrypted package resulting in a decrypted package comprising said modified artifact file;
install in an external computing system, said artifact file; and
store as a hidden file, said metadata with said installed artifact file.

15. The computer program product of claim 14, wherein said program instructions are further configured to validate based on said metadata, an origin of said artifact file by running said encryption key through said central key store database to retrieve said origin via said metadata.

16. The computer program product of claim 14, wherein said metadata defines terms describing said license agreement of said artifact file.

17. The computer program product of claim 12, wherein said information comprises data selected from the group consisting of a URL associated with a browser said computing system, an identification for said user, and a subnet used to perform said retrieving.

18. The computer program product of claim 12, wherein said program instructions to record said information comprises:
first instructions to record an ID for said requesting user;
second instructions to record a Website URL associated with retrieving said artifact file; and
third instructions to record a subnet ID for said computing system.

* * * * *